Dec. 14, 1965    W. B. SEIDEL    3,222,823
GRINDING MACHINE TRUING COMPENSATION MECHANISM
Filed April 2, 1963    4 Sheets-Sheet 1

INVENTOR.
WILLIAM B. SEIDEL
BY
Howard Keiser
& John F. Verhoeven
ATTORNEYS

Dec. 14, 1965 W. B. SEIDEL 3,222,823
GRINDING MACHINE TRUING COMPENSATION MECHANISM
Filed April 2, 1963 4 Sheets-Sheet 3

United States Patent Office 3,222,823
Patented Dec. 14, 1965

3,222,823
GRINDING MACHINE TRUING COMPENSATION MECHANISM
William B. Seidel, Cincinnati, Ohio, assignor to The Cincinnati Milling Machine Co., Cincinnati, Ohio, a corporation of Ohio
Filed Apr. 2, 1963, Ser. No. 269,998
6 Claims. (Cl. 51—165)

The present invention relates to grinding machine wheel truing and, more particularly, to compensation therefor.

In grinding machine operation, the grinding wheel is generally trued periodically, between grinds, as by passing a diamond point truing tool across the wheel along a path conforming to the desired profile on the wheel. For each truing operation (which may be performed after every grind in high precision work but, more generally, is performed less frequently) the diamond point must be adjusted toward the grinding wheel an incremental amount before moving across the wheel, and hence the radius of the grinding wheel immediately after each truing operation will be less than the radius thereof immediately after the previous truing operation by an amount equal to the incremental adjustment of the truing tool.

Since from one truing operation to the next, the radius of the grinding wheel is reduced an amount equal to the incremental adjustment of the truing tool, there must be a corresponding and equal adjustment between the workpiece support and the grinding wheel (or at least the final position of the grinding wheel during a feed cycle) or the final ground size of the workpieces will progressively grow larger as the grinding wheel grows smaller. This is well understood in the grinding machine art.

In a typical grinding machine, the length of the grinding feed stroke remains constant even as the grinding wheel diminishes in size from periodic truing and, consequently, either the workpiece support must be periodically adjusted toward the grinding wheel equally in amount and frequency to the adjustment of the truing tool toward the grinding wheel, or the zone of feed movement of the grinding wheel must be adjusted toward the workpiece support equally in amount and frequency to the adjustment of the truing tool toward the grinding wheel.

This dual adjusting movement will be referred to herein as truing compensation and it will be understood that this term refers to both the relative adjustment between the truing tool and the grinding wheel, and the relative adjustment between the grinding wheel and the workpiece to compensate for the reduction in grinding wheel size effected by each truing operation. This term as used herein does not include movement of the truing tool across the wheel to effect a truing cut thereon, nor feed of the grinding wheel into the workpiece to effect a grind thereon, nor is the present invention concerned per se with this cutting movement of the truing tool or this grind cycle feed movement of the grinding wheel.

It will be noted that truing compensation involves a relationship between the truing tool, the grinding wheel, and a workpiece (and hence between the support members thereof) and, in the typical grinding machine, truing compensation requires movement of two of the support members relative to the third support member, which is usually fixed. For example, during truing compensation, the workpiece support member might be fixed relative to a fixed base member and the grinding wheel support member adjusted relative to the base member to effect the desired adjustment between the grinding wheel and the workpiece. The truing tool support member would also be adjusted relative to the grinding wheel support member (hence relative to the base member) to effect the desired adjustment between the truing tool and the grinding wheel.

Heretofore, the adjustment of the two movable support members has been effected either independently of each other, or in unison through a motion transmitting train including, for example, screws and/or gears. In either situation, precise correspondence between the two required adjusting movements is difficult to attain and, if attained, is difficult to maintain.

In the present invention there is provided a single truing compensation actuator in camming relationship with both movable support members and a fixed member. Incremental movement of the single actuator along a path produces, through two cam surfaces, coordinated adjustment between the truing tool and the grinding wheel and between the grinding wheel and the workpiece. In the preferred form of the invention, the actuator defines a cam movable along a linear path on the grinding wheel support member and having two straight cam surfaces inclined with respect to said path. Camming relationship between the base and the grinding wheel support member (which is pivotally connected to the base) is effected through one of said cam surfaces and a roller fixed relative to the base during truing compensation to produce adjusting movement of the grinding wheel support member relative to the base, thereby producing the desired adjustment between the grinding wheel and the workpiece supporting member (which is fixed relative to the base). Camming relationship between the truing tool support member (which is pivotally connected to the grinding wheel support member) and the grinding wheel support member is effected through the other of said cam surfaces and a roller fixed relative to the truing tool support member to produce adjusting movement of the truing tool support member relative to the grinding wheel support member, thereby producing the desired adjustment between the truing tool and the grinding wheel. If, through original manufacturing inaccuracy or wear, the required relationship between the two adjusting movements is not exactly realized, one cam surface can be easily modified to secure the exact required correspondence.

It is therefore the object of the present invention to provide an improved truing compensation mechanism for a grinding machine. It is another object of the present invention to provide a truing compensation mechanism for a grinding machine which can be easily corrected to provide exact correspondence between adjusting movements. Other objects and advantages of the present invention should be readily apparent by reference to the following specification, considered in conjunction with the accompanying drawings forming a part thereof, and it is to be understood that any modifications may be made in the exact structural details there shown and described, within the scope of the appended claims, without departing from or exceeding the spirit of the invention.

Figure 1:
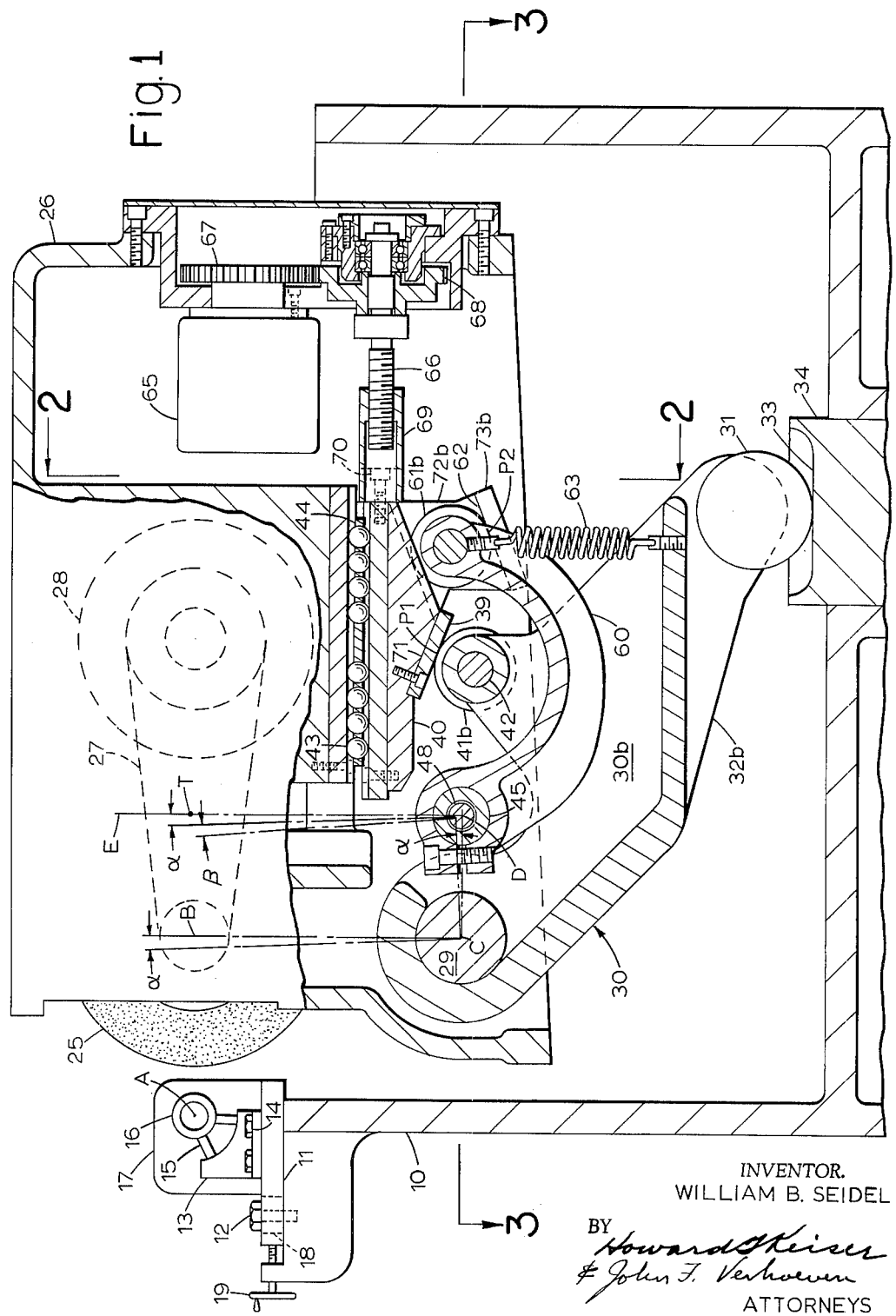
FIG. 1 is a fragmentary side elevational view, partly in cross-section, of a grinding machine incorporating the present invention.

There is shown in FIG. 1 a grinding machine having a stationary base member 10 with a headstock slide 11 mounted thereon. The headstock slide 11 is secured to the base member 10 by means of bolts 12. A workpiece support member 13 is secured to headstock slide 11 by bolts 14, and the member 13 has a pair of shoe members 15 which support a workpiece 16 in grinding position. A headstock 17 is secured to slide 11 and has a magnetic drive plate (not shown) engaged with the end of the workpiece to rotate the workpiece about an axis A defined by the shoes. For successive grinding operations on consecutive workpieces which are to be ground to the same size, the headstock slide 11 (and workpiece support member 13) remain fixed relative to base 10. If, however, a different size workpiece is to be ground, bolts 12 (which extend through narrow elongated slots 18 in slide 11) can be loosened and the position of the slide (and workpiece support member 13) on base 10 can be changed by means of handwheel 19.

The grinding wheel 25 is mounted in a grinding wheel support member, or wheelhead, 26 on axis B, and is rotated on said axis through belt 27 connected to a motor 28 mounted in the wheelhead. The wheelhead is mounted on a horizontal support shaft 29 secured in base 10. A feed lever 30 is mounted on shaft 29, between the walls of the wheelhead 26, and has a pair of spaced webs 30a, 30b extending downwardly and rearwardly therefrom which are joined at their lower end. A roller 31 is rotatably mounted between spaced ears 32a, 32b depending from the joined webs. The roller 31 is engaged with a horizontal track 33 formed in the upper end of cylinder 34 of a hydraulic motor 35. Cylinder 34 is slidably mounted in the base 10 and keyed thereto at 35a. Cylinder 34 has an internal bore 36 slidably received on a fixed piston 37 secured in the base. When motor line 38, continuously connected to chamber 39' above the piston through elongated cylinder groove 40', is connected to pressure, and motor line 41, continuously connected to chamber 42', below the piston through elongated cylinder groove 43', is connected to exhaust, cylinder 34 is raised to swing the feed lever 30 about the central axis C of support shaft 29. When the pressure and exhaust connections to the motor lines are reversed, the cylinder is lowered to the position shown and the feed lever is supported by the base through shaft 29, and through cylinder 34 and piston 37.

A truing compensation actuator 40 is mounted on the underside of the wheelhead and is interposed between the wheelhead and spaced rollers 41a, 41b mounted on cross shaft 42 in the feed lever 30, with cam surface 39 of the actuator engaged with the feed lever rollers. The weight of the wheelhead is partly borne by shaft 29 and partly transmitted to the feed lever 30 through the truing compensator actuator 40 and a plurality of balls 43 which are mounted in a ball guide 44 between the actuator and the wheelhead. Thus, when feed motor 35 is operated to raise cylinder 34, feed lever 30 is swung about axis C to tilt the wheelhead about axis C and feed the grinding wheel toward the workpiece 16. It will be understood that, by control of fluid flow through the motor lines 38, 41 to and from the motor 35 by a conventional hydraulic circuit, the feed movement of the grinding wheel will include a rapid advance movement up to the workpiece and a slower movement in grinding contact with the workpiece. When the pressure and exhaust connections to lines 38, 41 are reversed, and the feed lever returned to the position shown in FIG. 1, the grinding wheel 25 will be fully retracted from the workpiece.

Figure 2:
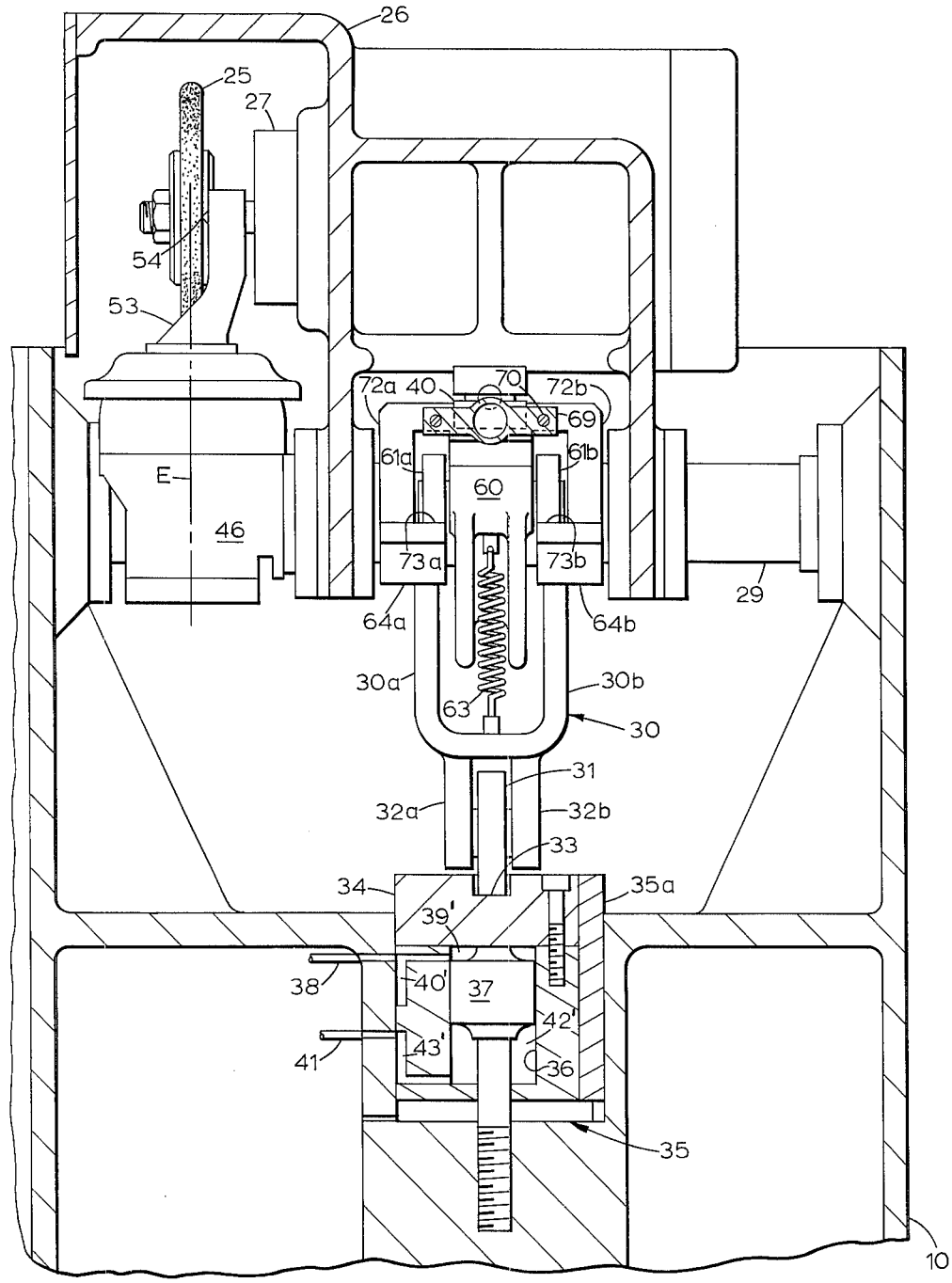
FIG. 2 is a view taken on the line 2—2 of FIG. 1.
Figure 3:
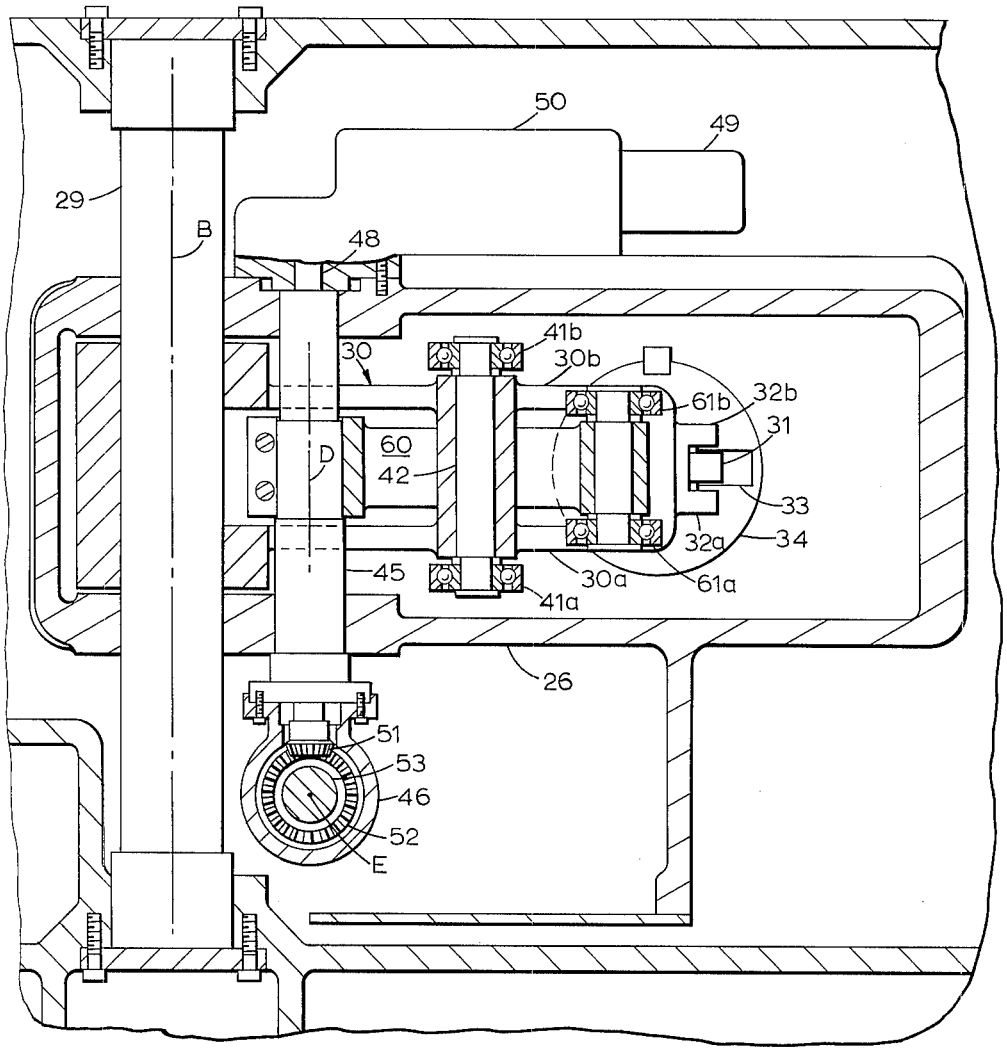
FIG. 3 is a view taken on the line 3—3 of FIG. 1.

A hollow horizontal truing tool support shaft 45, having a central axis D, is mounted in the wheelhead 26 below the grinding wheel 25 and parallel to the wheelhead support shaft 29. The truing tool support member 46 is secured to one end of shaft 45. A truing tool drive shaft 48 is journaled inside shaft 45 and connected at one end to the truing tool motor 49 through transmission 50. At the opposite end, shaft 48 carries a bevel gear 51 engaged with bevel gear 52 in support member 46. The truing tool support member 46 sup-
ports a truing tool carrier 53, connected to bevel gear 52, for rotation about the central axis E of support member 46 on operation of motor 49. At the upper end, the truing tool carrier 53 is offset from axis E (which, when support member 46 is in truing position, intersects the periphery of the grinding wheel) and a diamond pointed truing tool 54 is carried with its point spaced from axis E so that on operation of motor 49, in one direction and then the other, the diamond point is swung from a parked position on one side of the wheel (as shown in FIG. 2) around the periphery of the wheel, effecting a truing cut thereon, and is returned to its parked position.

A truing tool adjustment lever 60 is gripped at one end on truing tool support shaft 45 and extends therefrom between webs 30a, 30b, of the feed lever. Lever 60, at the end opposite support shaft 45, rotatably carries a pair of spaced rollers 61a, 61b. Rollers 61a, 61b are urged into engagement with cam surface 62 of the truing compensation actuator 40 by a spring 63 under tension connected between truing tool adjustment lever 60 and feed lever 30.

Figure 4:
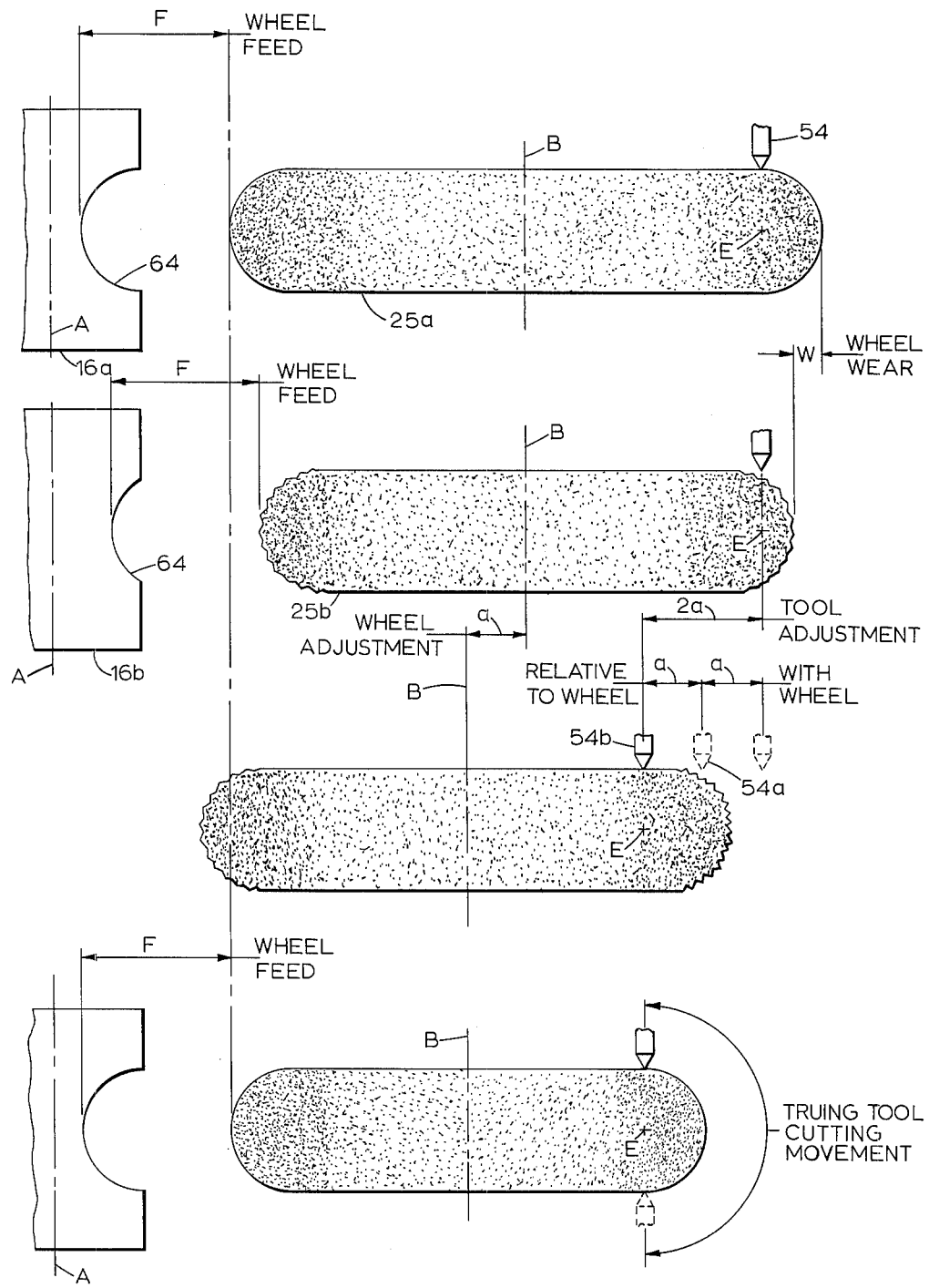
FIG. 4 is a schematic diagram showing the relationship between the workpiece position, the grinding wheel position, and the truing tool position before, during, and after, truing compensation.

In the schematic diagram of FIG. 4, the grinding wheel 25 is shown at 25a immediately after a truing operation thereon. The next workpiece 16 to be ground, shown at 16a, will have the annular groove 64 cut therein to the proper depth when the grinding wheel, in response to operation of fixed stroke motor 35, undergoes the predetermined feed movement F. As, after successive grinds on successive workpieces, the grinding wheel wears an amount W, for example, as shown at 25b, the predetermined feed movement F will produce a shallower groove 64 on a workpiece 16, as shown in the workpiece at 16b. To correct this condition another truing operation is required and, in conjunction with the truing operation, two adjustments, constituting the truing compensation, are required. In the present invention, these two adjustments are effected simultaneously in response to a single incremental movement of the truing compensating actuator.

For incremental movement of the actuator, a step electric motor 65 is mounted in the wheelhead and rotates a screw 66 a predetermined angular amount, also journaled in the wheelhead, through gears 67, 68. Screw 66 is threadedly received in a connector block 69 having lateral flanges secured to the truing compensator actuator 40 through bolts 70. Thus, a predetermined rotation of gear 67 by the step motor 65 will effect a predetermined rotation of screw 66, and a predetermined incremental linear movement to the left as viewed in FIG. 1 of actuator 40. The actuator 40 defines a cam and the surfaces 39, 62 thereon (engaged, respectively, with feed lever 30 and truing tool lever 60) define straight cam surfaces inclined at opposite angles to the straight path of movement of the actuator relative to wheelhead 26. The cam surface 39 is defined by the lower surface of detachable plate 71. The actuator 40 has spaced depending legs 72a, 72b with sloping platforms 73a, 73b extending inwardly therefrom, the upper surfaces of platforms 73a, 73b defining the cam surface 62.

The workpiece support member 13 is supported by the fixed base 10 through slide 11. During a series of grinds on successive workpieces 16 to be ground to the same size, the slide 11, and hence workpiece support member 13 is fixed relative to base 10. The feed lever 30 is supported by the base 10 through support shaft 29 and motor 35 and, between successive feed movements F of the grinding wheel, the feed lever is held fixed relative to the base 10 in the position shown in FIG. 1.

Truing compensation is effected between feed movements by incremental, linear, movement of actuator 40 to the left in FIG. 1 in response to operation of motor 65. It will be noted that actuator 40, which is mounted on the wheelhead 26, is interposed between the wheelhead 26 and the base with cam surface 39 engaged with rollers 41a, 41b on the feed lever 30 which is held fixed during truing compensation. Thus the actuator is in camming relationship with both the wheelhead (through balls 43) and the base (through feed lever 30, shaft 29, and motor 35) to determine relative movement therebetween in response to the incremental linear movement of the actuator. By virtue of incremental linear movement of actuator 40 to the left the wheelhead 26 is given a slight incremental angular adjustment α (exaggerated in FIG. 1 for clarity) relative to the base about axis C of the wheelhead support shaft 29. This advances the grinding wheel 25 a distance a (exaggerated in FIG. 4 for clarity) relative to the base 10 and toward the workpiece support 13.

It will be noted that if cam surface 62 were parallel to the linear path of movement of actuator 40 on the wheelhead, the surface 62 would merely support the end of truing tool adjustment lever 60 and would not contribute directly to any angular adjustment of the truing tool support member 46. However, the truing tool support member 46 would undergo an angular adjustment with the wheelhead and relative to the base, (advancing the diamond point a distance a with the advance of the wheel a distance a, as shown at 54a in FIG. 4) since the truing tool support member 46 is mounted in the wheelhead, but there would be no angular adjustment of the truing tool support member relative to the wheelhead and, hence no advance of the truing tool relative to the grinding wheel. Surface 62, however, is not parallel to the linear path of the actuator on the wheelhead, but is inclined relative to that path (oppositely to the incline of surface 39) so that, in addition to the angular adjustment of the truing tool support member relative to the base provided by the tilt adjustment α of the wheelhead, there is an angular adjustment β of the truing tool support member 46 relative to the wheelhead to advance the truing tool a distance a relative to the grinding wheel, as shown at 54b in FIG. 4. In other words, the cam actuator 40, which has the cam surface 62 engaged with rollers 61a, 61b of truing tool adjustment lever 60, is interposed between the wheelhead 26 and the truing tool support member (connected through support shaft 45 with truing tool adjustment lever 60) to establish a camming relationship between actuator 40 and truing tool support member 46 which determines relative movement between the wheelhead 26 and support member 46 in response to incremental linear movement of actuator 40 during truing compensation.

Thus, it will be seen that actuator 40 relates the relative movement between three members (base 10, wheelhead 26, and truing tool support member 46) during truing compensation, producing an adjusting movement of the movable grinding wheel 25 (and support member 26 therefor) relative to the fixed base, and producing an adjusting movement of the movable truing tool 54 (and support member 46 therefor) relative to the fixed base and relative to the grinding wheel (and grinding wheel support member 26).

If the distance between axis B and axis C is equal to the distance of axis C to the point P1 of contact of rollers 41a, 41b with surface 39, the axis B will advance a distance equal to the distance point P1 is raised, which will be the distance of linear movement of actuator 40 times the tangent of the angle of inclination of surface 39 to the linear path of actuator 40 on wheelhead 26. Similarly, if the tool 54 (indicated at T in FIG. 1) is spaced from axis D a distance equal to the distance of the axis D from the point of contact P2 of rollers 61a, 61b with surface 62, the truing tool will advance relative to the wheel an amount equal to the distance point P2 is raised, which will be the distance of linear movement of actuator 40 times the tangent of the angle of inclination of surface 62 to the linear path of actuator 40 on wheelhead 26.

The amount of incremental advance of actuator 40 for any given truing compensation is not critical (if the advance is sufficient to permit a truing cut to be taken on the grinding wheel) nor is it necessary that the incremental advance of actuator 40 be exactly the same from one truing compensation to the next. Thus the accuracy of the motion transmitting train between motor 65 and actuator 40 (gears 67, 68, screw 66) is not critical. It is, however, necessary that the incremental adjustment of the truing tool into the grinding wheel be exactly the same as the incremental advance of the grinding wheel toward the workpiece support, as shown in FIG. 4. This is so because both the adjustment of the wheel toward the work and the adjustment of the tool relative to the wheel, determine where the forward surface of the grinding wheel will be after the truing tool has been swung across the wheel in cutting engagement therewith. And this position of the wheel determines the depth of cut 64 on the next feed movement F of the grinding wheel. It sould be noted that any discrepancy between advance of the wheel relative to the workpiece support and between advance of the tool relative to the grinding wheel results in a size error in the workpiece which accumulates from truing operation to truing operation.

If the distance B–C and C–P1 are equal, and are equal to the distances T–D and D–P2 which are equal to each other, then the angles of inclination of surfaces 39 and 62 to the path of actuator 40 must be equal (but of opposite sense to that path). It is important to note that if experience shows the relative adjustment movement of the wheel toward the workpiece support is not exactly the same as the adjustment movement of the tool toward the wheel, plate 71 can be easily removed and surface 39 ground until correspondence is achieved.

What is claimed is:
1. In a grinding machine,
   (a) a fixed base member,
   (b) a workpiece support member, a grinding wheel support member, and a truing tool support member, one of said support members fixed relative to the base member for truing compensation and the other two support members movable relative to said one support member and the base member for truing compensation,
   (c) a truing compensation actuator mounted on one of said members for linear movement relative thereto along a path and in camming relationship with two other of said members to relate relative movement between three of said members for truing compensation, one of said three members fixed and the other two movable relative thereto in response to incremental linear movement of the compensation actuator along said path, said camming relationship effected through two straight cam surfaces inclined with respect to said path to produce predetermined relative movement between the grinding wheel support member and the workpiece support member and between the truing tool support member and the grinding wheel support member,
   (d) and means to produce an incremental linear movement of said compensation actuator along said path for each truing operation on the grinding wheel.
2. In a grinding machine,
   (a) a fixed base member,
   (b) a workpiece support member, a grinding wheel support member, and a truing tool support member, one of said support members fixed relative to the base member for truing compensation and the other two support members movable relative to said one support member and the base member for truing compensation,
   (c) a cam interposed between one of said fixed members and each of said movable members, said cam movable along a linear path and having two straight cam surfaces inclined with respect to said path to produce relative movement between the grinding wheel support member and the workpiece support member and between the truing tool support member and the grinding wheel support member, (d) and means to produce an incremental linear movement of said cam along said path for each truing operation on the grinding wheel.

3. In a grinding machine
(a) a fixed base member,
(b) a grinding wheel support member and a truing tool support member movable relative to each other and relative to the base member,
(c) a truing compensation actuator mounted on one of said members for movement relative thereto along a path and in camming relationship with the other two members, said camming relationship effected through two straight cam surfaces inclined with respect to said path to produce relative movement between the grinding wheel support member and the base member and between the truing tool support member and the grinding wheel support member,
(d) and means to produce an incremental movement of said compensation actuator along said path for each truing operation on the grinding wheel.

4. In a grinding machine
(a) a fixed base member
(b) a grinding wheel support member and a truing tool support member movable relative to each other and relative to the base,
(c) a cam mounted on one of said members for linear movement relative thereto along a path and having two straight cam surfaces inclined with respect to said path, said cam surfaces in camming relationship with the other two members to produce relative movement between the grinding wheel support member and the base member and between the truing tool support member and the grinding wheel support member,
(d) and means to produce an incremental linear movement of said cam along said path for each truing operation on the grinding wheel.

5. In a grinding machine having means to support a workpiece,
(a) a base member fixed relative to the workpiece supporting means,
(b) a grinding wheel support member having a grinding wheel and mounted on the base member for movement relative thereto,
(c) a truing tool support member having a truing tool and mounted on the grinding wheel support member for movement relative thereto,
(d) a cam mounted on the grinding wheel support member for incremental linear movement relative thereto along a path and having two straight cam surfaces inclined with respect to said path, one of said cam surfaces in camming relationship with the base member to effect incremental movement of the grinding wheel support member relative to the base member and the other cam surface in camming relationship with the truing tool support member to effect incremental movement thereof relative to the grinding wheel support member, said cam surfaces inclined at equal angles relative to said path to render movement of the grinding wheel relative to the workpiece support means equal to the movement of the truing tool relative to the grinding wheel.

6. In a grinding machine having a fixed base member, the combination comprising
(a) means to support a workpiece in fixed relation to the base during truing compensation,
(b) a grinding wheel support member having a grinding wheel and pivotally mounted on the base member for tilting movement relative thereto to advance the grinding wheel toward the workpiece,
(c) a truing tool support member having a truing tool and pivotally mounted on the grinding wheel support member for tilting movement relative thereto to advance the truing tool toward the grinding wheel,
(d) a cam mounted on the grinding wheel support member for linear movement relative thereto along a path and having two straight cam surfaces inclined with respect to said path, one of said cam surfaces in camming relationship with the base member to tilt the grinding wheel support member relative to the base member and advance the grinding wheel toward the workpiece support means and the other of said cam surfaces in camming relationship with the truing tool support member to tilt the truing tool support member relative to the grinding wheel support member and advance the truing tool toward the grinding wheel, said cam surfaces inclined at predetermined angles to said path to tilt the grinding wheel support member and truing tool support member, respectively, through predetermined angles in response to a predetermined increment of linear movement of the cam to render the advance of the grinding wheel toward the workpiece support means equal to the advance of the truing tool toward the grinding wheel.

References Cited by the Examiner
UNITED STATES PATENTS

| | | | |
|---|---|---|---|
| 2,388,066 | 10/1945 | Markus | 51—165.14 |
| 2,665,681 | 1/1954 | Hass et al. | 125—11.7 |
| 2,850,849 | 9/1958 | Babbitt | 51—165.14 |
| 2,929,172 | 3/1960 | Pasell | 125—11.18 |
| 3,143,832 | 8/1964 | Waldrich | 51—165.14 |

ROBERT C. RIORDON, *Primary Examiner.*

HAROLD D. WHITEHEAD, *Examiner.*